United States Patent Office 3,838,105
Patented Sept. 24, 1974

3,838,105
POLYURETHANE PREPARED FROM HYDROXY POLY(METHYLENE OXIDE), POLYESTER, AND GLYCOL AND HAVING IMPROVED HYDROLYTIC STABILITY
Armand Edward Brachman, Allentown, Pa., assignor to GAF Corporation, New York, N.Y.
No Drawing. Filed May 31, 1972, Ser. No. 258,160
Int. Cl. C08g 22/14
U.S. Cl. 260—75 NP                                    6 Claims

ABSTRACT OF THE DISCLOSURE

Polyurethanes having excellent hydrolytic stability and being especially adapted for injection molding are prepared by reacting a mixture of a hydroxyl terminated polyester having a molecular weight between 600 and 800 and a hydroxyl poly(alkylene oxide) having a molecular weight from about 800 to 2500 and an aliphatic glycol, said mixture having an average molecular weight of about 360 to about 470, with a diisocyanate in molar amounts substantially equal to the total moles of hydroxyl polyester, polyether and aliphatic glycol.

BACKGROUND OF THE INVENTION

This invention relates to polyurethanes and relates more particularly to polyurethanes comprising the reaction product of a mixture of a hydroxyl terminated polyester, a hydroxyl poly(alkylene oxide) and a glycol; reacted with an aryl diisocyanate, which are particularly adapted to injection molding, while at the same time having improved hydrolytic stability.

Polyurethanes, such as disclosed in U.S. Pats. 2,289,411, 2,871,218 and 3,493,634 are stated to have a balance of physical properties and to be readily extruded into goods and articles. However, such polyurethanes do not satisfactorily injection mold nor do they have excellent hydrolytic stability. Therefore, it is an object of this invention to provide improved polyurethane of that type which is especially adapted to injection molding, and retain hydrolytic stability.

The elastomeric polyurethanes described in U.S. Pat. 2,899,411 are prepared by reacting together a mixture of certain hydroxyl poly(alkylene oxide)s and glycols, with diphenyl diisocyanates. Another class of useful polyurethanes are obtained by reacting together a mixture of certain polyesters mixed with the glycols, with diphenyl diisocyanates as described in 2,871,218. The polyurethanes prepared in accordance with either of these two patents have modest tensile strengths and other physical and chemical properties. These materials may be readily processed in the usual processing equipment, such as calenders and are extruded to form useful articles. However, none of the materials prepared in accordance with said patents are satisfactory for injection molding operations. In using such materials in injection molding, the following problems are encountered; difficulty in filling mold cavities, sticking in the mold, shrinkage and long cycle times, and poor hydrolytic stability.

It has now been found that when a mixture of about 60 to 85 parts of a hydroxyl polyester having a molecular weight between 600 and 800 is mixed with about 15 to about 40 parts by weight of hydroxyl poly(alkylene oxide) having a molecular weight of between about 800 and about 2500 and from about 0.25 to 2.5 moles of an aliphatic glycol per mole of total hydroxyl polyester and hydroxyl poly(alkylene oxide) to provide a mixture having an average molecular weight of about 300 to about 700, and thereafter reacting with a diphenyl diisocyanate in a molar amount equal to the total moles of hydroxyl polyester, hydroxyl poly(alkylene oxide) and aliphatic glycol, a polyurethane is obtained having a good balance of valuable physical properties and quite unexpectedly, readily molded in commercial injection molding machines without the disadvantages encountered in the polyurethanes aforedescribed.

The novel and improved polyurethanes of this invention are particularly adapted to injection molding and among the advantages of these materials over the prior art polyurethanes are faster molding cycles, improved flow and setup characteristics, improved mold release characteristics and the fact that they may be used to produce molded articles with high fidelity to mold dimensions, and shrinkage problems associated with polyurethanes of the above patents are not encountered in injection molding the defined polyurethanes. These polyurethanes can be injection molded in either ram or reciprocating screw machines and no machine modifications are required. These polyurethanes have been found to possess tensile strengths greater than 7500 p.s.i.

SUMMARY OF THE INVENTION

It is an object of the instant invention to avoid one or more drawbacks of the prior art.

It is another object of the invention to provide for a polyurethane composition having improved hydrolytic stability.

It is still another object of the invention to provide for such a composition based on a polyurethane containing polyether, polyester and a glycol.

It is a further object of the invention to provide a composition which also has good moldability and is well adapted to injection molding.

Further objects and advantages of the invention will be more apparent as the description proceeds.

Broadly speaking, the instant invention includes the provision of a polyurethane adapted for injection molding and having improved hydrolytic stability comprising the reaction product of a mixture of (A) a hydroxy terminated polyester having a molecular weight of between about 600 and 800, (B) a hydroxyl poly(alkylene oxide) having a molecular weight of between about 800 and 2500 and (C) an aliphatic glycol reacted with (D) an aryl diisocyanate, the molar amount of (A), (B) and (C) combined being substantially equivalent to the molar amount of (D). The polyurethane contains approximately by weight 60 to 85 parts (A), 15 to 40 parts (B) and 0.25 to 2.5 moles (C) per mole of (A) and (B); component (C) contains 2 to 12 carbon atoms and said mixture has an average molecular weight of about 300 to about 700.

There is found generally good injection molding performance of compositions based on 1,4-butanediol adipate ($B_1D$-Ad), 1,4-butanediol ($B_1D$), and 4-4'diphenyl methane diisocyanate (MDI). Additional testing for hydrolytic stability by boiling in water for 70 hrs. reveals only modestly good resistance to degradation when a higher molecular weight polyester is used. It is quite surprising to note that compositions with $B_1D$-Ad molecular weights in the 650 to 800 range have significantly improved hydrolytic stability. Furthermore, injection molding studies on a "Van Dorn RS-50" injection molding machine demonstrate good moldability for these polyurethanes. In fact, thin parts were more easily molded. The polyurethanes are useful for mechanical parts, belts, films, containers and coatings requiring good abrasion resistance, toughness and oil resistance characteristic of polyurethanes.

The polyester preferred for use in this invention is an essentially linear hydroxyl terminated polyester having a molecular weight of between about 600 and about 900 and an acid number less than 10. Preferably the polyester has a molecular weight of from about 600 to about 800 and an acid number less than 5, and optionally an acid number less than about 3, in order to obtain a product of optimum physical properties. The molecular weight is determined by assay of the terminal functional groups and is an average molecular weight. The polyester is prepared ordinarily by an esterification reaction of an aliphatic dibasic acid or an anhydride thereof with a glycol. Molar ratios of more than 1 mole of glycol to acid are preferred so as to obtain linear chains containing a preponderance of terminal hydroxyl groups.

The basic polyesters utilized include polyesters prepared from the esterification of such dicarboxylic acids as adipic, succinic, pimelic, suberic, azelaic, sebacic and the like or their anhydrides. Preferred acids are those dicarboxylic acids of the formula HOOC—R—COOH wherein R is an alkylene radical containing 2 to 10 carbon atoms. More preferred are those represented by the formula $$HOOC(CH_2)xCOOH$$

wherein $x$ is a number from 2 to 8. Adipic acid is preferred. The glycols utilized in the preparation of the polyester by reaction with the aliphatic dicarboxylic acid are preferably straight chain glycols containing from about 4 to about 10 carbon atoms such as butanediol-1,4; hexamethylenediol-1,6; octamethylenediol-1,8 and the like. In general the glycol is preferably of the formula $HO(CH_2)xOH$, wherein $x$ may be 2 to 10, but preferably is 4 to 8, butanediol-1,4 is particularly preferred.

The hydroxyl poly(alkylene oxide)s preferred for use in this invention are essentially linear hydroxyl terminated materials having ether linkages as the major linkage joining the carbon atoms, as, O, and having a molecular weight between about 800 and 2500. Hydroxyl poly (ethylene oxide)s are further preferred, particularly at a molecular weight of from about 900 to about 1100. The hydroxyl poly(methylene oxide)s used in the practice of the invention include hydroxyl poly(trimethylene oxide); hydroxyl poly(tetramethylene oxide); hydroxyl poly (pentamethylene oxide); hydroxyl poly(hexamethylene oxide), mixtures thereof and the like.

In the practice of the invention an aliphatic glycol in an amount from about 0.25 to 2.5 moles per mole of polyester and polyether is employed, preferably 0.75 to 2.25. The alkylene glycol must be mixed with the polyester and hydroxyl poly(alkylene oxide) prior to reaction of the mixture with the diphenyl diisocyanate. Aliphatic glycols containing 2 to 12 carbon atoms are contemplated for use in this invention. The glycol preferred for this purpose in butanediol-1,4. Other glycols which may be employed include pentanediol, hexanediol, octanediol, dodecanediol and the like which preferably contain the hydroxyl groups in terminal position. A valuable group of glycols are alkylene glycols containing 4 to 6 carbon atoms.

While any aryl diisocyanate may be employed to react with the hydroxyl polyester, hydroxyl poly(methylene oxide) and glycol to form useful products, diphenyl methane diisocyanate; diphenyl methane-p,p'-diisocyanate; dichlorodiphenyl methane diisocyanate; dimethyl diphenyl methane diisocyanate; diphenyl dimethyl methane diisocyanate; dibenzyl diisocyanate; bitolylene diisocyanate; diphenyl ether diisocyanate and the like of the formula

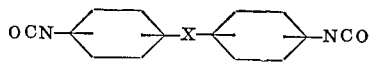

wherein X may be a valence bond, an alkylene radical containing preferably 1 to 5 carbon atoms, NR wherein R is an alkyl radical, oxygen, sulfur, SO$_2$ and the like; and the isocyanate groups are preferably in a para-position. More preferred are the diphenyl methane diisocyanates, and excellent results are obtained from diphenyl methane-p,p'-diisocyanate (MDI).

DETAILED DESCRIPTION

The ratio of reactants employed may be varied from about 1.25 to 3.5 moles of diphenyl diisocyanate per mole of hydroxyl poly(methylene oxide) and polyester with from about 0.25 to about 2.5 moles of glycol, the amount of glycol used depending in part upon the molecular weight of the hydroxyl poly(methylene oxide) and polyester employed. The amount of diphenyl diisocyanate used is in turn dependent upon the total amount of glycol, and polyester and should be a molar amount equivalent to these latter reactants so that there are essentially no free unreacted isocyanate and hydroxyl groups remaining in the reaction product. Particularly useful products are obtained with mole ratios of reactants of 1 mole of hydroxyl poly(methylene oxide) and hydroxyl polyester, 0.75 to 2.25 moles of aliphatic diol and 1.75 to 3.25 moles of diphenyl diisocyanate.

An essential part of this invention is that the mixture of aliphatic glycol, hydroxyl polyester and hydroxyl poly-(methylene oxide) has an average hydroxyl number molecular weight of about 300 to about 700, and more preferably from about 370 to about 470. When these values are not observed for the mixture of polyester, glycol and polyether glycol which is then reacted with the diphenyl diisocyanate, polyurethanes are obtained which do not have the necessary and desired balance of physical properties required for a good hydrolytic stability and injection molding polyurethane material. In other words when the average molecular weight of the mixture is below about 300 and above about 700 the polyurethanes made therefrom are not suitable for commercial injection molding. To obtain these average molecular weights for the mixture it is necessary that the molecular weights and amount of glycol used be balanced within the quantities set forth hereinabove. In other words, with very high molecular weight polyesters or polyether glycols, very large amounts of glycol are required to give the desired average molecular weight. Thus, not only must the average molecular weight of the mixture be observed, but it must be obtained by using hydroxyl polyesters and polyalkylene glycols of the types and molecular weights set forth hereinabove, and the glycol used must also be present within the ranges set forth hereinabove.

As is apparent from the above recited ratios of reactants for preparing the unique elastomers of this invention, a product is obtained in which there is essentially no free or unreacted diisocyanate or glycol. An excess of diisocyanate greater than that required to react with the hydroxyl poly(methylene oxide) results in products which have a poor balance of useful physical properties. Of course, a small amount of unreacted isocyanate groups may be tolerated but it is desirable that they are essentially reacted. Likewise, excess free unreacted glycol results in products which are likewise less valuable. An excess of either glycol or diisocyanate of less than about 5 percent above that required for complete utilization of the reactants is desirable. Preferably, the molar amount of hydroxyl poly(methylene oxide) and glycol combined is substantially equivalent to the molar amount of diphenyl diisocyanate employed. More preferred, of course, are equimolar reacting ratios of all reactants.

The reaction employed to prepare the novel products of the invention should be conducted under anhydrous conditions with dry reactants, that is, that the reaction mixture is substantially free of water. It is recognized that as a practical matter it is difficult to conduct such a reaction with absolutely dry reactants under completely anhydrous conditions so the requirements of this invention are met when the reaction mixture is essentially free of water. It should be noted that when the reaction is substantially complete it is not necessary to rigidly guard against the introduction of water into the reaction mixture. As a guide, there should be less than about 0.1% water present in the reaction mixture.

The polyurethanes are readily obtained by melting the polyester and adding the polyether glycol and aliphatic diol thereto, while in a molten state adding the aryl diisocyanate and heating, normally at a temperature above 100° C. to complete the reaction.

For example, a mixture of measured amounts of polyester, polyether glycol and aliphatic diol are melted and stirred for about one hour at a pressure of about 5 mm. and a temperature of 100° C. To this mixture is added a measured amount of a diisocyanate as diphenyl methane-p,p'-diisocyanate (MDI), weighed out and charged to within ±0.5% of the stoichiometric equivalency of NCO groups to OH groups, the molar amount of the diisocyanate thereby being substantially equivalent to the molar amount of the polyester polyether glycol and the aliphatic glycol combined. The reaction mixture is stirred for 1 to 5 minutes, and then heated in "Teflon" coated trays for 1 to 2 hours at 140° C. to complete the reaction.

A series of polyurethanes were prepared in accordance with the procedure described above. Hydroxyl polyesters of different molecular weights were used. The proportions and physical properties of the resulting products are set forth in the table below. The hydroxyl polyester was prepared from 1,4-butanediol and adipic acid. All parts and proportions herein and in the appended claims are by weight unless otherwise specified.

EXAMPLE I

The procedure employs a 500 ml. glass resin jar fitted with a stainless steel, air-driven, propeller type agitator, a thermometer, a nitrogen inlet and a nitrogen exit port. The resin jar is provided with an electrically heated silicone oil bath, held at about 175° C., the resin jar is dried by heating to 100° C., followed by a nitrogen purge for 30 minutes. Polyesterdiol, polyetherdiol, and butanediol are added to the resin jar along with modifiers (when used). The oil bath is raised; when the temperature has risen to about 100° C., 4,4'-diphenylmethane diisocyanate is injected into the resin jar from a heated syringe. The melt rapidly exotherms to about 185° C. Agitation is continued for about 3 minutes as the system thickens. The hot, semi-solid melt is transferred to a shallow polytetrafluoroethylene lined pan using a spatula, and a polytetrafluoroethylene coated lid is placed on the resin melt. The melt is then cured in a circulating air oven at 150° C. for 45 minutes.

|  | M.w. | Grams | Equiv. |
|---|---|---|---|
| 1,4-butanediol adipate | 631 | 312.0 | .9888 |
| Polytetramethyleneether glycol | 989 | 78.0 | .1576 |
| 1,4-butanediol | 90 | 38.5 | .8563 |
| Neodol 23 (Shell C$_{12-13}$ primary alcohol) | 197 | 3.9 | .0200 |
| Total |  |  | 2.0227 |
| MDI | 250 | 252.6 | 2.0200 |

The polyurethane resins produced have a very light color and excellent tensile and elastomeric properties, as shown below. Table A compares the instant polyurethane (lines 1–4) with that of a polyurethane using a polyester segment having a higher molecular weight (lines 5–8).

TABLE A

[Polyurethane tensile properties tested by ASTM D 412;1,4-butanediol-adipate (80)/Polytetramethyleneether glycol* (20) MDI]

| Polyester, m.w. | Break elongation, percent | | Tensile, p.s.i. | | Change (percent) in— | |
|---|---|---|---|---|---|---|
|  | Orig. | Boiled | Orig. | Boiled | Elongation | Tensile |
| 1 | 584 | 563 | 585 | 8,695 | 5,015 | +4 | −42 |
| 2 | 631 | 641 | 740 | 7,857 | 5,630 | +15 | −28 |
| 3 | 700 | 552 | 612 | 8,773 | 7,281 | +11 | −17 |
| 4 | 769 | 623 | 636 | 7,930 | 4,073 | +2 | −49 |
| 5 | 892 | 642 | 503 | 7,690 | 2,602 | −22 | −66 |
| 6 | 1,088 | 672 | 416 | 7,428 | 3,273 | −38 | −56 |
| 7 | 1,134 | 675 | 441 | 6,858 | 2,162 | −35 | −69 |
| 8 | 2,457 | 410 | 175 | 3,337 | 1,897 | −57 | −43 |

*M.w.=1,000.

The above table shows that elastomers with desirably high elongations were obtained with the polyester precursors of the instant composition. Tensile strength is also high over the instant composition. Tensile strength is also high over this range. However, when test strips were immersed in boiling water for 70 hrs., a commonly used test for screening hydrolytic stability of polyurethanes, those based on a molecular weight higher than 800 butanedioladipate had lost significant amounts of break elongation when the boiled samples had been dried, conditioned and retested. Those with molecular weight of 769 and lower even gained elongation slightly, clearly demonstrating no loss in elasticity had occurred.

Injection molding tests are conducted on a Van Dorn RS50 reciprocating screw injection molding machine. Test specimens included thin (.025 x 2.5 x 3.0 inch) sheets, medium thick (⅛″) test dumbbells, and thick (½″) discs, about 1″ in diameter. "Moldability" is rated in the following manner:

Excellent: An injection molded part, free from visual defects, is obtained over a wide range of injection molding conditions. This rating requires facile molding of parts with modest cycle times.

Good: An injection molded part, free from visual defects, is obtained only over a more limited range of conditions. This rating allows for some surface defects if the operator believes that these defects could be removed by additional condition changes that could not be worked out due to insufficient material. Complete mold fill is a requirement.

Fair: An injection molded part is obtained with serious imperfections that are not corrected despite changing many variables. The imperfections are generally in the form of numerous surface blemishes in thin sheets and bubbles or sink marks in the thick disks. Mold fill is still a requirement.

Poor: An unacceptable injection molded part is obtained over a wide range of injection molding conditions which generally results from lack of mold fill, decomposition, or excessive curing times.

TABLE B

[Moldability of butanediol-adipate/PTMEG 80/20 MDI polyurethanes]

|  | Adipate, m.w. | Dumbbell shrinkage, percent | Thin film | ⅛″ dumbbell | ½″ disc |
|---|---|---|---|---|---|
| 1 | 600 | 2.6 | Good | Good | Not tested. |
| 2 | 750 | 1.6 | do | Excellent | Excellent. |
| 3 | 800 | 1.6 | do | do | Fair. |
| 4 | 900 | 4.5 | do | do | Good. |
| 5 | 1,100 | 1.6 | Fair | do | Do. |

The above table shows consistently good thin sheet moldability for the preferred composition (1–3). The 750+800 molecular weight modifications also generated dumbbells with ease. The 750 molecular weight modification was the only composition that rated excellent for a thick part. In all cases the claimed compositions had satisfactory low shrinkage when compared with a commercial injection molding polyurethane (4–5).

Having thus described my invention, what I claim as new and novel and desire to be secured by Letters Patent, is as follows:

1. A polyurethane adapted for injection molding and having improved hydrolytic stability comprising the reaction product of a mixture containing approximately by weight (A) 60–85 parts of a hydroxy terminated polyester having a molecular weight of between about 600 and 800, (B) 15–40 parts of a hydroxyl poly(methylene oxide) having a molecular weight of between about 800 and 2500 and (C) about 0.25–2.5 moles of an aliphatic glycol per mole of total (A) and (B) reacted with (D) an aryl diisocyanate, the molar amount of (A), (B) and (C) combined being substantially equivalent to the molar amount of (D).

2. The polyurethane of claim 1 wherein component (C) contains 2 to 12 carbon atoms and in addition said mixture has an average molecular weight of about 300 to about 700.

3. The polyurethane of claim 1 wherein component (A) is a polyester of an aliphatic dicarboxylic acid containing 4 to 12 carbon atoms and an aliphatic glycol containing between 4 to 10 carbon atoms, component (B) is a hydroxyl poly(methylene oxide) and component (C) contains 2 to 10 carbon atoms.

4. The polyurethane of claim 3 wherein component (A) has a molecular weight between about 625 and 775, component (B) has a molecular weight of about 900 to 1100, component (C) contains 4 to 6 carbon atoms and the average molecular weight of the mixture is about 370 to about 470.

5. The polyurethane of claim 4 wherein component (A) is a hydroxyl poly(tetramethylene adipate), component (B) is poly(tetramethylene ether) glycol, component (C) is 1,4-butanediol, component (D) is diphenyl methane-p,p-diisocyanate and the polyurethane has a tensile strength greater than 7500 p.s.i., and a percent change in elongation break after being boiled for 24 hours of no more than about 20%.

6. The polyurethane of claim 5 wherein about 80 parts of component (A) and about 20 parts of component (B) are present in the mixture with the 1,4-butanediol.

References Cited

UNITED STATES PATENTS

| | | | |
|---|---|---|---|
| 3,364,157 | 1/1968 | Halek et al. | 260—67 TN X |
| 3,766,298 | 10/1973 | McAndrew | 260—75 NP X |
| 3,664,979 | 5/1972 | Tanomura et al. | 260—75 NK |
| 3,463,758 | 8/1969 | Stewart | 260—75 |
| 3,192,185 | 1/1967 | Achterhof et al. | 260—75 |
| 3,296,211 | 1/1967 | Winkler et al. | 260—75 |

OTHER REFERENCES

Gaylord: Polyethers, Part I, Interscience, New York (1963), pp. 21–48.

HERBERT S. COCKERAM, Primary Examiner

U.S. Cl. X.R.

260—67 TN, 858